No. 820,386. PATENTED MAY 15, 1906.
R. M. BRYCE.
MACHINE FOR MOLDING, DIVIDING, AND SHAPING DOUGH.
APPLICATION FILED DEC. 31, 1903. RENEWED MAR. 14, 1906.
2 SHEETS—SHEET 1.
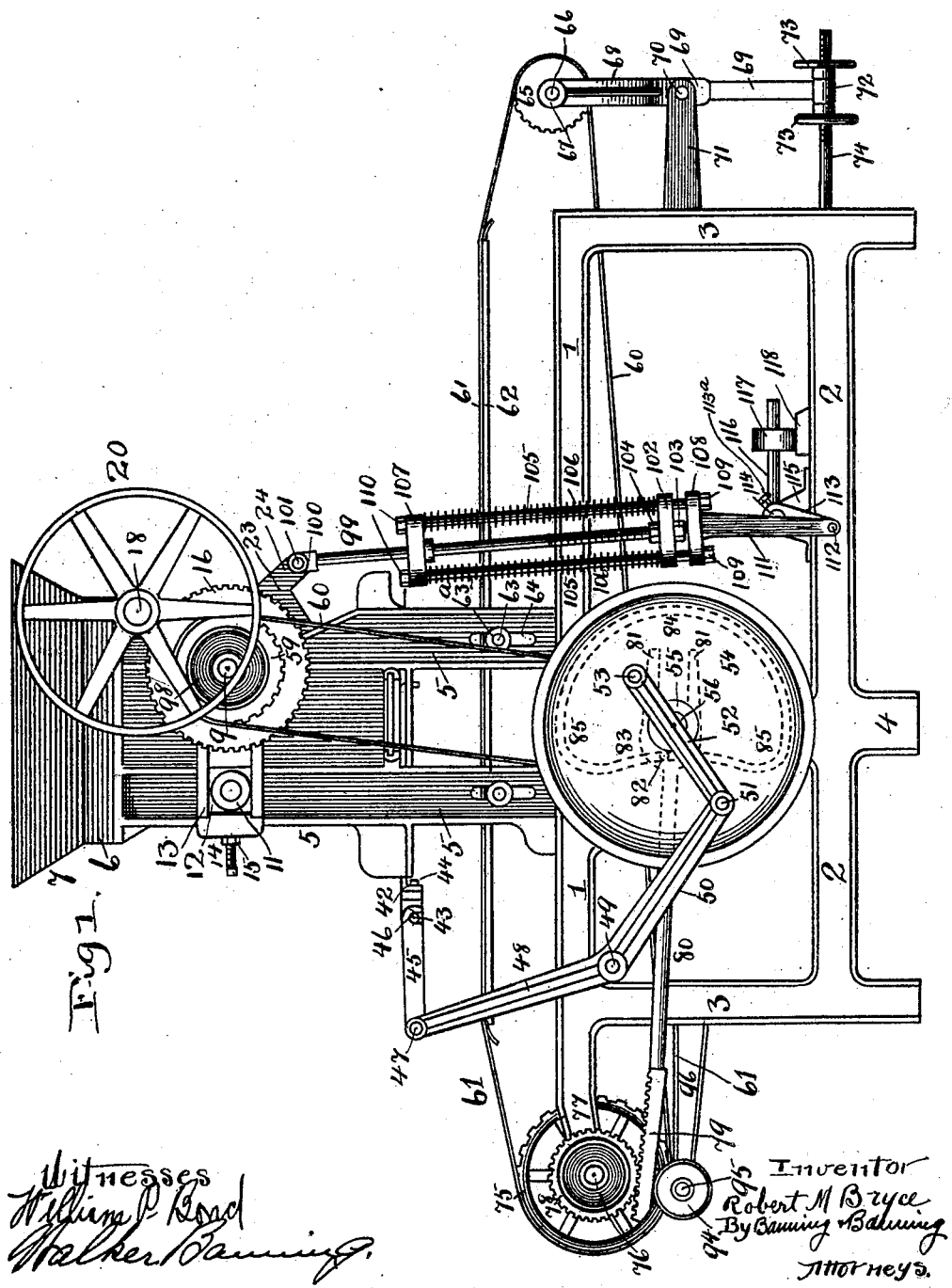

No. 820,386. PATENTED MAY 15, 1906.
R. M. BRYCE.
MACHINE FOR MOLDING, DIVIDING, AND SHAPING DOUGH.
APPLICATION FILED DEC. 31, 1903. RENEWED MAR. 14, 1906.
2 SHEETS—SHEET 2.
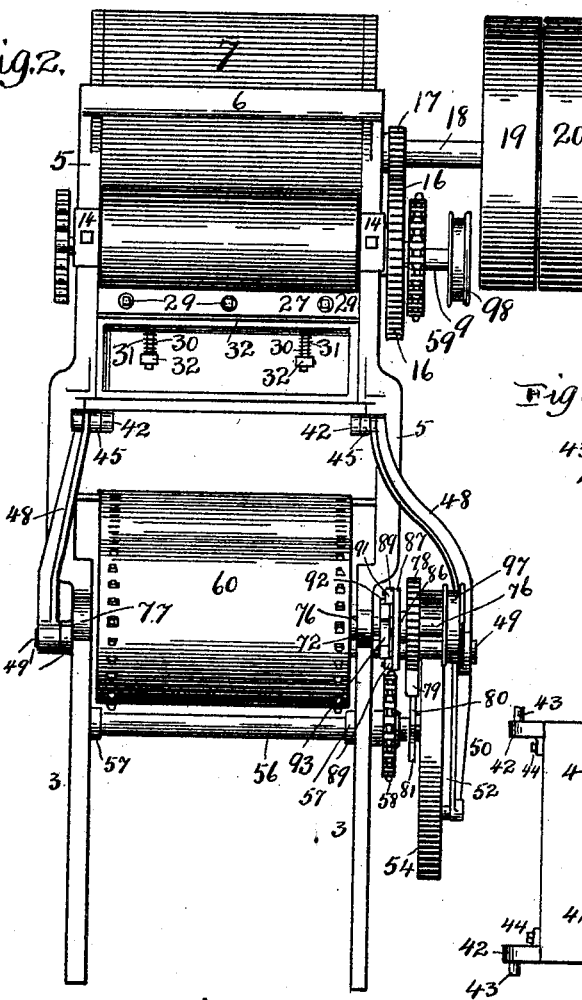

UNITED STATES PATENT OFFICE.

ROBERT M. BRYCE, OF CHICAGO, ILLINOIS.

MACHINE FOR MOLDING, DIVIDING, AND SHAPING DOUGH.

No. 820,386.            Specification of Letters Patent.            Patented May 15, 1906.

Application filed December 31, 1903. Renewed March 14, 1906. Serial No. 306,015.

*To all whom it may concern:*

Be it known that I, ROBERT M. BRYCE, a citizen of the United States, residing at Chicago, in the county of Cook and State of Illinois, have invented a certain new and useful Improvement in Machines for Molding, Dividing, and Shaping Dough, of which the following is a specification.

This invention relates to machines for the use of bakers in preparing their wares as regards the shape, cutting, and dropping of the dough in the production of different wares made by bakers, and has for its objects to improve the construction and operation of the means for feeding the dough to the shaping and cutting devices; to provide a release in the event of overcrowding or overfeeding of the dough to the shaping and cutting mechanism; to improve the construction and operation of the cutting devices and the operating means therefor by which the cutting operation will be automatically performed and at the same time the cutter will furnish a rest or support for the dough against projecting below the fixed member of the cutting devices while the movable member thereof is out of its cutting position; to furnish a carrier adapted to support pans or other receptacles or to receive thereon direct the dropped dough after the severance thereof by the cutting devices; to give the carrier an automatic step-by-step advance, so as to carry the pan or receptacle after it is filled forward and bring a pan or receptacle into position to be filled; to advance the carrier automatically through the medium of a rack and pinion, a ratchet and disk, and a cam and have the movement of the carrier properly timed in relation to the operation of the cutting devices; to actuate the cutting devices and the carrier or conveyer from a single disk; to furnish means for automatically weighing the amount of dough contained in each divided piece, and to improve generally the construction and operation of the several mechanisms which enter into the machine as a whole.

The invention consists in the features of construction and combinations of parts hereinafter described and claimed.

In the drawings, Figure 1 is a side elevation of the machine of the invention; Fig. 2, an end elevation of the same; Fig. 3, a cross-section through the hopper and the molding and feed rolls for the dough; Fig. 4, a plan view of the movable cutter for severing the dough; Fig. 5, a face elevation of the disk, showing the cam-groove and a portion of the rod for giving the carrier or conveyer a step-by-step advance, and Fig. 6 a face view of the ratchet-and-disk member of the mechanism for advancing the carrier or conveyer step by step.

The machine, in the form shown, has a main frame consisting of side pieces, each side piece having a top rail 1, a bottom rail 2, end standards or uprights 3, and an intermediate standard or upright 4, with the ends of the uprights or standards 3 and 4 extending below the bottom rail and furnishing feet for the frame. Each top rail 1 has secured thereto and extending up therefrom side standards 5, which standards are open at their lower portion and are united together at their upper portion, so as to form a box for the dough below the hopper, and the side standards at their upper ends are united by a cross-bar 6, having an inclined inner face to receive and support a hopper 7 for the dough. At the apex of the hopper on two opposite sides are located molding and feed rolls 8, one of which has its shafts 9 mounted in fixed bearings or boxes on the standards or uprights 5 and the other one of which has its shaft 10 mounted in movable boxes or bearings 11, located at each end of the shaft in a channel or guideway 12 between guides 13 on the side of the dough-box, as shown in Fig. 1, and each journal box or bearing 11 is connected with a threaded stem 14, passing through the wall of the dough-box and having thereon a lock or stop nut 15, by means of which the journal box or bearing can be advanced or receded to adjust the opening between the two feed-rolls 8 for the passage of the proper amount of dough from the hopper into the dough-box below the dough molding and feed rolls.

The shaft 9 of one of the rolls 8 projects beyond the side of the dough-box and has fixed thereon a gear 16, which meshes with a gear or pinion 17, fixed on a shaft 18, which shaft has thereon a fast belt-pulley 19 and a loose belt-pulley 20, by means of which rotation is given to the shaft 18 to revolve the molding and feed roll of the shaft 9, and the feed-roll of the shaft 10 can be driven by friction or by gearing between the two shafts or otherwise in any suitable manner or can be self-revolved by the passage of the dough between the two feed-rolls. The dough-box on one side has an opening which is closed by a door 21, located below the feed, which door, as shown, is suspended by eyes 22 at its upper end from the shaft 9, but could be otherwise supported so as to swing outwardly. The door has extending out therefrom a flange or plate 23, terminating in an ear 24, which ear is connected with a closing mechanism, as hereinafter described. The door is held by the closing mechanism against opening outwardly when the dough is being fed properly by the feed-rolls into the dough-box; but in the event of an overfeed or an overpressure of the dough in the box from any cause the door can swing outwardly, thus relieving the overfeed or overpressure and preventing an excess of dough from being forced into position to be acted upon by the cutting devices. The door at its lower end swings above a shelf 25 and at each end has a side plate 26 in the construction shown, so that the dough when the door is swung open will be upheld by the shelf and will be returned to the dough-box with the return of the door to its normal position. The construction shown has beneath the feed-roll 8 of the shaft 10 a scraper 27, the body of which has slots 28 for the passage of screws 29, by means of which the scraper is attached to the side of the dough-box so as to have a free upward movement against the face of the feed-roll, and, as shown, the scraper is held in its advanced position by stems 30, each stem having therearound a coiled spring 31 and each stem passing through ears or guides 32 on the face of the side of the dough-box, as shown in Figs. 2 and 3.

The lower end of the dough-box is closed by a plate 33, having an upwardly-projecting flange 34, forming a chamber or depression 35 above the upper face of the plate, and the plate 33 has therein one or more holes 36, through which the dough is forced in a regulated amount or quantity by the action of the feed-rolls in carrying the dough from the hopper into the dough-box, and it is to be understood that the shape of the hole or holes 36 is to be varied to suit the ware that is to be cut, shaped, and dropped. The plate 33 in the arrangement shown has on two of its opposite sides tongues 37, which enter a groove between flanges 38 on the inner face of the side wall of the hopper-box, as shown in Fig. 3, and thus removably secure the plate 33 in place, and this plate 33 with its hole or holes constitutes the fixed member of the cutter for severing the dough. A plate 39 is located immediately below and coacts with the plate 33, and the plate 39 has therein a hole or holes 40, the construction shown in Fig. 4 having four holes, and with four holes the plate 33 will have four holes 36 to coöperate with the holes 40 of the plate 39, a hole 36 and a hole 40 coöperating with each other. The plate 39 constitutes the movable member of the cutter for severing the dough, and the holes 40 are spaced apart so as to leave between them and at each end a section 41 of the plate, which forms a rest or support for the dough when the plate or cutter 39 has been moved so as to sever the projected portion of the dough. The plate or cutter 39 in doing the cutting has its openings 40 pass in line with the openings 36, and in this relation the dough is free to be projected through the openings 36 and 40, so that the projected portion with the movement of the plate or cutter 39 will be severed and shaped, for which purpose in the arrangement shown the sides of the openings 40 are beveled, so as to furnish sharp or cutting edges by which the dough will be cut off or severed.

The plate or movable cutter 39 at one side near each end has secured thereto an ear 42, each ear having a projecting pin or pivot 43, and each ear, as shown, is secured to an end flange on the plate 39 by a bolt 44; but the ears with their pins or pivots could be otherwise connected with the plate or cutter. Each ear has to coact therewith a link 45, having in its forward end a notch 46 to take over the pin or pivot 43, as shown in Fig. 1, and the opposite end of each link is connected by a pin or pivot 47 with the upper end of an arm 48, the lower end of which is mounted on a pin or pivot 49, projecting out from the side piece of the frame. The arm 48 on one side has a continuing or second arm 50, the lower end of which is connected by a pin or pivot 51 with the end of a link 52, the other end of which link is attached by a pin or pivot 53 to a disk 54, having a hub 55 attached to a shaft 56, which shaft is supported in suitable journal boxes or bearings 57 on the sides of the main frame, as shown in Figs. 1 and 2. The disk 54 is revolved from the shaft 56 and through the link 52 oscillates or vibrates the joined arms 48 and 50 on the pin or pivot 49, and the swing or vibration of the upper end of the arm 48 through the connecting-link 45 gives a reciprocating movement to the plate or cutter 39, by which it will be carried to and fro for its hole or holes 40 to pass under the hole or holes 36, allowing the dough to pass through the hole or holes to a regulated or specified quantity, and with the full movement the projected dough will be cut off by the action of the cutting edges around the hole or holes 40 and the solid portions 41 of the plate will come into position to retain the dough against passing through the hole 36 until these holes are brought into line with the holes 40 by the return of the plate or cutter 39, and it will be seen that at the initial movement of the plate or cutter 39 in either direction to perform the severing operation the solid portions of the plate or cutter surrounding the holes commence at once to close the hole or holes 36 and prevent or shut off the passage of dough through the holes 36, thus making the plate or cutter 39 both a means for dividing the projected dough and for retaining the dough against being projected through the holes in the bottom plate of the hopper-box. The shaft 56 in the arrangement shown projects at one end beyond the side piece of the main frame and has fixed thereon a sprocket-wheel 58, which coacts with a sprocket-wheel 59 on the shaft 9 and through a sprocket-chain 60 imparts rotation to the shaft 56 and the disk 54 from the rotation of the shaft 9, thus driving the feed-rolls and the disk 53 from one and the same source of power.

A carrier or conveyer 61, made of any suitable material, is located and travels below the cutting devices, so that the divided portions of the dough will drop onto the carrier or conveyer or into pans or receptacles supported on the carrier or conveyer. The carrier or conveyer, as shown, travels over a table 62, which table is secured to supports on stems 63, which stems extend through slots 64 in the standards 5, and each stem is threaded at its end and receives a nut 63$^a$, by means of which the stems can be loosened, so as to allow the table 62 to be adjusted higher or lower and when adjusted locked in position by tightening the nuts. The carrier or conveyer at one end runs over a roller 65, mounted on a shaft 66, supported in journal boxes or bearings 67 on the ends of the arms 68 of a fork, which fork extends up from a center bar 69, connected by a pin or pivot 70 with an arm 71, extending out from the main frame of the machine, as shown in Fig. 1, and the arm 69 at its lower end has a socket 72, on each side of which is a hand-wheel 73, threaded onto the end of a rod 74, extending out from the main frame, so that by turning the hand-wheels 73 the lower end of the arm 69 can be moved toward or from the end of the machine, swinging the arms 68 of the fork in the direction required to keep the carrier or conveyer taut, the roller 65 serving both as a traveling means for the carrier or conveyer and also as a means for tightening the carrier or conveyer.

The carrier or conveyer is supported at its opposite end to the roller 65 by a roller 75 on a shaft 76, mounted in suitable journal boxes or bearings at the end of extensions 77 of the top rail 1 of the main frame. The shaft 76 has loosely mounted thereon a pinion 78, with which meshes a rack 79 at the end of a rod 80, which rod at its other end is forked for the arms 81 of the fork to straddle the shaft 56, as shown by the dotted lines in Fig. 1 and the full lines in Fig. 5. The fork at its closed end carries a pin 82, which projects into a cam-groove in the face of the disk 54, which cam-groove has an inward curve 83 and an outward curve 84, joined one to the other by short curves 85, so that as the disk is revolved the cam-groove, by the engagement of its outwardly-curved portion 84 with the pin, acts to carry forward the rod 80, and with it the rack 79, giving the pinion 78 a backward rotation, and with the engagement of the inwardly-curved section 83 of the cam-groove with the pin 82 the rod 80 will be quickly receded, moving the rack 79 rearwardly and giving an advance rotation to the pinion 78, so that the pinion has a forward-and-backward movement to the same extent with each full revolution of the disk 54 through the action of the cam-groove. The pinion 78 has a hub or flange 86, to which is united an arm 87, so that with the forward-and-backward rotation of the pinion the arm 87 will be oscillated. Each end of the arm 87 has mounted therein by a suitable pin or pivot 88 a pawl 89, and each pawl is connected with the arm by a coiled spring 90, so as to be free to rise and fall and at the same time be held in operative position. Each pawl 89 has an acting end 91, which engages with a notch 92 in the periphery of a disk 93, the disk, as shown, having four notches 92, and the disk 93 is keyed or otherwise fixedly secured to the shaft 76, so that with the throw of the arm 87 and its pawls 89 the disk will be intermittently advanced, turning the shaft 76 accordingly and giving a step-by-step advance to the carrier or conveyer. The rack 79 is held in engagement with the pinion 78 by a wheel 94, mounted on a journal-pin 95 on the end of an arm 96, extending out from the main frame, which wheel allows the rack to move freely forward and backward and at the same time maintains the rack and pinion in engagement with each other. At the extreme end of the shaft 76 is a pulley-wheel 97, and on the extreme end of the shaft 9 is a pulley-wheel 98, over which pulley-wheels a belt (not shown) runs, which belt enables the shaft 76 to be continuously driven from the shaft 9, giving a continuous rotation to the roller or drum 75, by which the carrier or conveyer 61 is given a continuous travel. It will thus be seen that by means of the rack and pinion and the ratchet and pawl the carrier or conveyer can be given a step-by-step advance, and by means of the pulleys 97 and 98 the carrier or conveyer can be given a continuous travel, it being understood that when the carrier is advanced step by step the belt is off from the pulley-wheels.

A rod 99, having at its upper end a head 100, is attached by a pin or pivot 101 to the end of the arm 24, and this rod at its lower end is screw-threaded and passes through a cross-head 102 and is adjusted as to its length in relation to the cross-head by nuts 103 and 104, operative on the thread of the rod. The cross-head 102 is slidable on rods 105, each rod having a coiled spring 106 around it, and the rods are connected at one end by a cross-head 107 and at the other end by a cross-head 108, each rod having at one end a head 109 and at the other end a nut 110, by means of which the cross-heads are held in place. The rod 99 is slidable in the upper cross-head 107 and is held in its lowermost position by the engagement of the lower end of the springs 106 with the cross-head 102, the upper ends of the springs engaging the cross-head 107, and the springs permit the rod and cross-head 102 to be raised and serve to return the rod 99 and cross-head 102 to normal position. The swing of the door 21 outward raises the arm 24, and with it the rod 99 and cross-head 102, against the resistance of the springs 106, and with the relief of the overfeed or overpressure of the dough, which caused the door 21 to open, the springs 106 act and carry the door back to its closed position with the return of the rod 99 and cross-head 102 to normal position. The lower cross-head 108 has extending downwardly therefrom a stem 111, the lower end of which is connected by a pin or pivot 112 with a crank 113, fixedly attached by a set-screw 113$^a$ to a shaft 114, mounted in a support 115, attached to the main frame of the machine. The shaft 114 has extending out therefrom a rod 116, on which is a holding-down weight 117, which when the parts are in operative position bears against a rest 118, as shown in Fig. 1, and prevents the crank 113 from moving upward with the opening of the door. The stem 111 and the crank 113 by setting the crank 113 at different positions on the shaft 114 and locking it in position with the set-screw 113$^a$ can be adjusted in such relation to each other as to give the support for the rod 99 and the rod more or less of an inclination, so that the draw on the springs as the door opens will be at one side of a straight vertical line, thus insuring the dividing of the same amount or weight of dough in each instance no matter what the position of the sliding rod 99 and the cross-head 102 may be, as the springs will exert the required counterbalance or permit the door 21 for the feed of the dough through the cutting devices to be regular and uniform in quantity. The weight when thrown to the opposite side from that shown in Fig. 1 serves to hold the door open for access to be had to the interior of the dough-box for cleaning or other purposes.

The operation is as follows: The dough is placed in the hopper 7 and the machine started by throwing the belt onto the fast pulley or from other driving means. The molding and feed rollers as they revolve carry the dough from the hopper to pass between the rolls into the dough-box, and with the hole or holes of the fixed cutter and the movable cutter passing in line with each other a portion of the dough will be forced through the forming-holes of the two members of the cutter as the holes pass each other. The carrier or conveyer is in a state of rest when the dough is being forced through the forming-holes and the required amount of dough is being divided off by the action of the movable member of the cutting devices, the pin 53 in the disk, through the link 52, moving the arm 50 and the arm 48 for the arm 48 to throw the movable member of the cutter and sever the dough, and the divided portion or portions of the dough will drop into the pan or receptacle beneath the dough-box on the carrier or conveyer or direct onto the face of the carrier or conveyer, as may be desired. The movement of the plate or cutter 39 in either direction brings the solid portions 41 of the plate into use as a retainer or rest, gradually shutting off the projection of dough through the hole or holes of the plate 33 as the holes are passed by the plate 39 and holding the dough against being fed through the hole or holes from the dough-box when the plate 39 has completed its throw in either direction. An overpressure or overfeed from any cause does not affect the weight or amount of dough divided, as passing through the cutters the swinging door 21 will open against the controlling-springs and furnish a relief for the overfeed or overpressure and at the same time maintain a uniform pressure on the dough. The dough which has been severed and dropped is carried forward by the advance of the carrier or conveyer 61 through the action of the rack and pinion and the ratchet and pawl, moving the filled pan or receptacle out of the way and bringing a new pan or receptacle into position to receive the next dropping of dough, and with the advance of the carrier or conveyer the movable member of the cutter commences to move in one direction or the other for the hole or holes of the stationary and movable members to pass into line and divide the next portion of dough that is to be projected, severed, shaped, and dropped through the hole or holes. These movements of the parts will continue as long as the machine is run until the full amount of goods or wares have been cut, shaped, and dropped.

The machine is simple in construction, and the several mechanisms which enter into its operation have a unit of action by which the molding, cutting, and shaping of the dough is attained with rapidity and without any particular attention on the part of the operator, as the machine after it is once started, so far as concerns the molding, cutting, shaping, and dropping and moving the dropped material out of the way will perform the work automatically, and by providing the swinging door and the controlling means therefor in opening and closing the necessary relief is furnished in case of overfeed or overpressure of the dough in the dough-box without increase in the weight or quantity projected, and by giving the carrier or conveyer a step-by-step advance in proper coacting relation with the cutting devices one batch of dropped material is automatically moved out of the way before the next batch is cut, shaped, and dropped. These advantages add to the utility of the machine and furnish a machine which will enable a baker to cut, shape, and drop the dough without any particular attention, and it is to be understood that the cutting devices are to have the proper shape of holes to produce the required form of ware, the holes being oblong, diamond-shaped, circular, oval, or other form, as may be required, and the movable cutter having a formation by which the dough after the projected portion has been severed and during the severing operation will be held or retained in the dough-box, thus making the movable member both a cutter and a retainer for the dough.

The rolls 8 not only serve as a means for feeding the dough from the hopper into the dough-box, but also act as kneaders by which the dough is brought into shape for use, as the pressure on the dough in its passage between the rolls acts to compress, compact, and bring together the particles in the same manner as dough is manipulated by hand kneading. The adjustable roll enables the action of the two rolls to be regulated to suit the amount of dough passed from the hopper into the dough-box and also to give the kneading action for bringing the dough into a condition for use. The swinging door, in connection with the resistant springs, allows of the necessary yield of the door in opening in the event of too much dough being forced into the dough-box without affecting the pressure in the dough-box by which the dough is forced through the cutting devices, with the result that in the use of the machine a regulated quantity or weight of dough is projected, divided, shaped, and dropped. The movable reciprocating cutter acts in both directions in the arrangement shown, and while the movable cutter is passing beneath the fixed cutter the dough will be projected until the holes in the two cutters have passed each other by the movement of the movable cutter, and by having the movable cutter and the carrier or conveyer so timed in their respective movements that the carrier or conveyer will be advanced after a dropping of dough has been made and will remain stationary until the next dropping occurs it will be seen that the dividing, shaping, and dropping and the carrying away of the dropped portion occur at the proper time. The return of the actuating devices for the carrier or conveyer is slow; but in order to bring the carrier or conveyer or the pans or receptacles thereon into position for each dropping of dough the advance movement should be rapid, and for this reason the section 83 of the cam-groove has an inward curve by which the pin on the rod will be moved rapidly, causing the ratchet and pawl to operate quickly and advance the carrier or conveyer.

What I claim as new, and desire to secure by Letters Patent, is—

1. In a machine for molding, dividing and shaping dough, the combination of a hopper for containing dough, means for feeding the dough from the hopper, a dough-box into which the dough is fed from the hopper, a cutting device at the discharge end of the dough-box, consisting of a fixed member provided in its body with a hole, and a slidable cutting member provided with a hole having two cutting edges and adapted to close the hole in the fixed member at the beginning and end of each forward slide and each return slide and have the hole therein pass over and register with the hole in the fixed member on each forward and each return slide for cutting off with each forward and each return slide the quantity of dough projected through both holes while partially and entirely in register with one another and preventing the projection of dough at the end of the forward and return slides respectively, substantially as described.

2. In a machine for molding, dividing and shaping dough, the combination of a hopper for containing the dough, means for feeding the dough from the hopper, a cutting device consisting of a fixed member provided in its body with a symmetrical hole and a slidable cutting member provided with a symmetrical hole having two cutting edges and adapted to close the hole in the fixed member at the beginning and end of each forward slide and each return slide and have the hole therein pass over and register with the hole in the fixed member on each forward and each return slide for cutting off with each forward and each return slide the quantity of dough projected through both holes while partially and entirely in register with one another and prevent the projection of dough at the end of the forward and return slides respectively, substantially as described.

3. In a machine for molding, dividing and shaping dough, the combination of a dough-box into which the dough is fed, a cutting device at the discharge end of the dough-box consisting of a fixed member provided in its body with a hole and a slidable cutting member located below and in facial contact with the fixed member and provided with a hole having two cutting edges and adapted to close the hole in the fixed member at the beginning and end of each forward slide and each return slide and have the hole therein pass over and register with the hole in the fixed member on each forward and each return slide for cutting off with each forward and each return slide the quantity of dough projecting through both slides while partially and entirely in register with one another and preventing the projection of dough at the end of the forward and return slides respectively, substantially as described.

4. In a machine for molding, dividing and shaping dough, the combination of a hopper for containing the dough, feed-rolls at the mouth of the hopper carrying the dough to the hopper, a dough-box into which the dough is fed by the feed-rolls from the hopper, and a cutting device at the discharge end of the dough-box consisting of a fixed member provided in its body with a symmetrical hole and an automatically-actuated slidable cutting member provided with a symmetrical hole having two cutting edges and adapted to close the hole of the fixed member at the beginning and end of each forward and each return slide and have the hole therein pass over and register with the hole in the fixed member on each forward and each return slide for cutting off with each forward and return slide the quantity of dough projected through both holes while partially and entirely in register with one another and preventing the projection of dough at the end of the forward and return slides respectively, substantially as described.

5. In a machine for molding, dividing and shaping dough, the combination of a hopper for containing the dough, means for feeding the dough from the hopper, a dough-box into which the dough is fed from the hopper, and a cutting device at the discharge end of the dough-box consisting of a fixed member provided in its body with a plurality of shaping-holes and a slidable cutting member exterior of and lying in facial contact with the fixed member and provided with a plurality of cutting-holes corresponding to and adapted to coincide with the holes of the fixed member and adapted to close the holes in the fixed member at the beginning and end of each forward slide and each return slide and have the holes therein pass over and register with the holes in the fixed member on each forward and each return slide for cutting off with each forward and each return slide the quantity of dough projected through both sets of holes while partially and entirely in register with each other and preventing the projection of dough at the end of the forward and return slides respectively, substantially as described.

6. In a machine for molding, dividing and shaping dough, the combination of a hopper for containing the dough, means for feeding the dough from the hopper, a dough-box into which the dough is fed from the hopper, and a swing-door in one wall of the dough-box and yieldably supported for the door to open and prevent the transmission of overpressure in feeding the dough, substantially as described.

7. In a machine for molding, dividing and shaping dough, the combination of a hopper for containing the dough, means for feeding the dough from the hopper, a dough-box into which the dough is fed from the hopper and having on one side in its wall an opening, a yieldable swing-door for the opening, a slidable rod connected at one end with the door and at the other end with a cross-head, guide-rods for the cross-head, and springs engaging the cross-head for allowing the door to yield under an excess of pressure and closing the door with the removal of the pressure, substantially as described.

8. In a machine for molding, dividing and shaping dough, the combination of a hopper for containing the dough, means for feeding the dough from the hopper, a dough-box into which the dough is fed from the hopper and having on one side in its wall an opening, a yieldable swing-door for the opening, a slidable rod connected at one end with the door and at the other end with a cross-head, guide-rods for the cross-head, cross-heads fixedly attached to the guide-rods and forming a frame with the guide-rods for the slidable rod, a stem on the lower fixed cross-head, and an oscillating support for the stem, substantially as described.

9. In a machine for molding, dividing and shaping dough, the combination of a hopper for containing the dough, means for feeding the dough from the hopper, a dough-box into which the dough is fed from the hopper and having on one side in its wall an opening, a spring-controlled support for the door, a crank having the stem pivotally connected thereto, a shaft for the crank, and a weight-rod for the shaft, substantially as described.

10. In a machine for molding, dividing and shaping dough, the combination of a hopper for containing the dough, means for feeding the dough from the hopper, a dough-box into which the dough is fed from the hopper, a cutting device at the discharge end of the dough-box, the cutting device consisting of a fixed member and an automatically-actuated movable member operative in both directions of travel across the fixed member, a carrier traveling below the cutting device, and means for giving the carrier a step-by-step advance in coöperative relation with the movements in both directions of travel of the movable member of the cutting device, substantially as described.

11. In a machine for molding, dividing and shaping dough, the combination of a hopper for containing the dough, means for feeding the dough from the hopper, a dough-box into which the dough is fed from the hopper, a cutting device at the discharge end of the dough-box, the cutting device consisting of a fixed member and an automatically-actuated movable member, a carrier traveling below the cutting device, a roller at one end of the carrier, a shaft on which the roller is mounted, a pinion loosely mounted on the shaft, a rack coöperating with the pinion, and a ratchet and pawl operated from the rack and pinion to give the carrier a step-by-step advance, substantially as described.

12. In a machine for molding, dividing and shaping dough, the combination of a hopper for containing the dough, means for feeding the dough from the hopper, a dough-box into which the dough is fed from the hopper, a cutting device at the discharge end of the dough-box, the cutting device consisting of a fixed member and an automatically-actuated movable member, a carrier traveling below the cutting device, a roller at one end of the carrier, a shaft on which the roller is mounted, a pinion loosely mounted on the shaft, a rack coöperating with the pinion, an arm connected with the pinion, pawls one at each end of the arm, and a disk fixed to the roller-shaft and having notches in its periphery engaged by the pawls, for giving the carrier a step-by-step advance, substantially as described.

13. In a machine for molding, dividing and shaping dough, the combination of a hopper for containing the dough, means for feeding the dough from the hopper, a dough-box into which the dough is fed from the hopper, a cutting device at the discharge end of the dough-box, the cutting device consisting of a fixed member and an automatically-actuated movable member, a carrier traveling below the cutting device, a roller at one end of the carrier, a shaft on which the roller is mounted, a pinion loosely mounted on the shaft, a rack coöperating with the pinion, a rod carrying the rack, a pin on the rod, and a disk having a cam-groove engaging with the pin, substantially as described.

14. In a machine for molding, dividing and shaping dough, the combination of a hopper for containing dough, means for feeding the dough from the hopper, a dough-box into which the dough is fed from the hopper, having in one of its walls an opening, a swinging door for the opening in the wall of the hopper, and resistance-springs connected with the door and operating to maintain a constant pressure on the door in opening without affecting the direct feed of the dough from the dough-box, substantially as described.

15. In a machine for molding, dividing and shaping dough, the combination of a hopper for containing dough, means for feeding the dough from the hopper, a dough-box into which the dough is fed from the hopper having in one of its walls an opening, a swinging door for the opening in the wall of the hopper, resistance-springs connected with the door and operating to maintain a constant pressure on the door in opening without affecting the direct feed of the dough from the dough-box, and cutting devices located at the discharge end of the dough-box and through which the dough is fed under a regulated pressure for projecting, dividing and shaping the dough, substantially as described.

16. In a machine for molding, dividing and shaping dough, the combination of a hopper for containing the dough, feed-rolls at the mouth of the hopper carrying the dough from the hopper, a dough-box into which the dough is fed by the rolls from the hopper, a revoluble shaft for driving the feed-rolls, a cutting device at the discharge end of the dough-box consisting of a fixed member and a movable member with the movable member operative in both directions of travel across the fixed member, a revoluble shaft driven from the shaft of the feed-roll, a disk on the revoluble shaft, means operated from the disk for actuating the movable member of the cutting device, a carrier for the dropped dough having a step-by-step advance given thereto coincident with the movements in both directions of the movable member of the cutting device, and means actuated from the revoluble disk to give the carrier its step-by-step advance, substantially as described.

ROBERT M. BRYCE.

Witnesses:
OSCAR W. BOND,
WALKER BANNING.